(12) United States Patent
Larsen et al.

(10) Patent No.: US 8,106,540 B2
(45) Date of Patent: Jan. 31, 2012

(54) COMPENSATION SYSTEM FOR POWER TRANSMISSION

(75) Inventors: Einar V. Larsen, Charlton, NY (US); Bruce E. English, Saratoga Springs, NY (US); Goran Drobnjak, Munich (DE)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 12/249,404

(22) Filed: Oct. 10, 2008

(65) Prior Publication Data

US 2010/0090537 A1     Apr. 15, 2010

(51) Int. Cl.
*H02J 1/02*       (2006.01)
*H02M 1/12*      (2006.01)
*H02M 1/14*      (2006.01)

(52) U.S. Cl. ............... 307/105; 290/43; 290/44; 290/55; 322/58

(58) Field of Classification Search ............. 307/105; 322/58; 290/43, 44, 55
See application file for complete search history.

(56) References Cited

U.S. PATENT DOCUMENTS

| | | | |
|---|---|---|---|
| 3,555,291 A | | 1/1971 | Dewey |
| 3,859,542 A | * | 1/1975 | Kennedy ................ 307/401 |
| 3,881,137 A | | 4/1975 | Thanawala |
| 4,355,241 A | * | 10/1982 | Hingorani ............... 307/102 |
| 4,616,286 A | * | 10/1986 | Breece ................... 361/56 |
| 4,623,830 A | * | 11/1986 | Peneder et al. ........... 318/798 |
| 4,698,721 A | * | 10/1987 | Warren .................. 361/110 |
| 4,843,513 A | | 6/1989 | Edris |
| 5,262,677 A | * | 11/1993 | Ramirez ................. 307/105 |
| 5,825,162 A | * | 10/1998 | Kida et al. .............. 323/210 |
| 5,864,185 A | * | 1/1999 | Neugebauer et al. ....... 307/105 |
| 6,021,035 A | | 2/2000 | Larsen et al. |
| 6,075,425 A | * | 6/2000 | Gopfrich et al. .......... 333/181 |
| 6,157,552 A | | 12/2000 | Kern et al. |
| 7,244,524 B2 | * | 7/2007 | McCluskey et al. .......... 429/9 |
| 7,298,059 B2 | | 11/2007 | Delmerico et al. |
| 7,939,956 B1 | * | 5/2011 | Larsen .................. 290/44 |
| 2002/0005668 A1 | * | 1/2002 | Couture ................. 307/98 |
| 2005/0225263 A1 | * | 10/2005 | Van Egmond ............. 315/291 |

* cited by examiner

*Primary Examiner* — Jared Fureman
*Assistant Examiner* — Justen Fauth
(74) *Attorney, Agent, or Firm* — James W. Pemrick; Ernest G. Cusick; Frank A. Landgraff

(57) ABSTRACT

A system is provided for compensating a power transmission line having one or more non-conventional power generating sources connected to the power transmission line. At least one series compensation circuit is connected to a portion the power transmission line, and at least one damping circuit is connected in parallel with the series compensation circuit. The damping circuit reduces subsynchronous series resonance caused by the series compensation circuit on the power transmission line, and the series compensation circuit compensates the power transmission line.

20 Claims, 6 Drawing Sheets

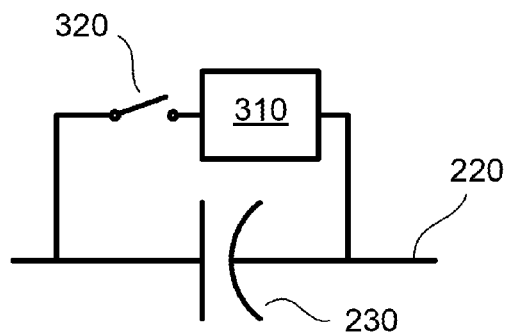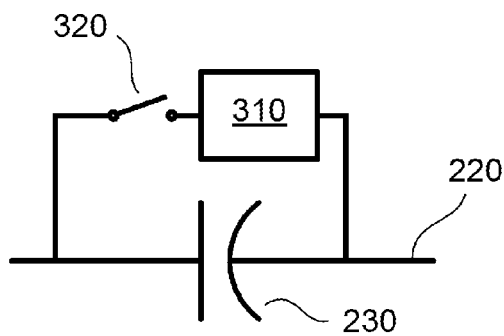
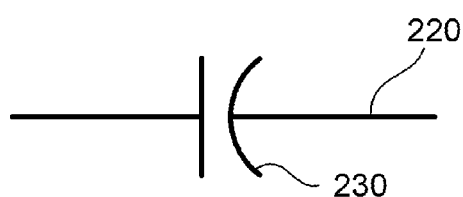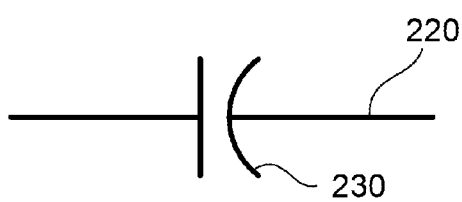
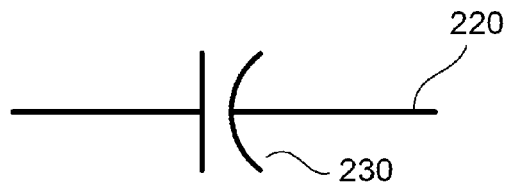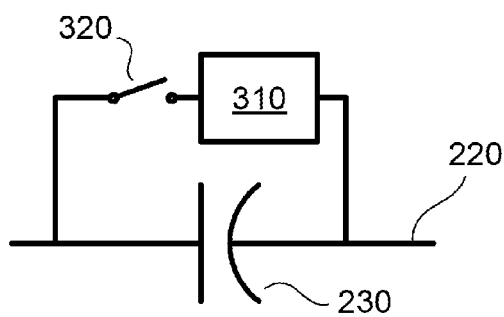
FIG. 6  FIG. 7

COMPENSATION SYSTEM FOR POWER TRANSMISSION

BACKGROUND OF THE INVENTION

The present invention relates to power transmission. More particularly, this invention relates to a system for compensation of power transmission lines.

The quality of power distributed through modern electrical distribution systems continues to be an issue concerning operators of large systems. One such power quality problem is known as voltage flicker. Voltage flicker is a voltage dip that is of a magnitude sufficient to have an objectionable effect on other loads connected to the same circuit. The disturbance may be experienced as only blinking lights, but the magnitude and the frequency of the occurrences determine flicker's impact on system users.

FIG. 1 illustrates a common voltage flicker scenario. Flicker-producing loads 110 on system 100 are typically caused by large motors, welders, or arc-furnaces. These loads are characterized by high inrush currents of relatively short duration, as experienced in the starting of a motor. The motor's inrush current is typically of a low power factor, and causes a voltage dip of increasing magnitude along the feeder up to the point of the load's connection. This causes voltage flicker problems between the load and the source 120, which, when severe enough often leads to a user complaint 130.

The distribution series capacitor 140 has long been recognized as a cost-effective solution to these types of flicker problems. Unfortunately, distribution-class electrical power lines equipped with a distribution series capacitor are subject to two distinct and damaging phenomena, ferroresonance involving transformers, and self-excitation of motors during starting. Ferroresonance is an often severe and rapidly building oscillatory overvoltage condition caused by system non-linearities that can appear when power transformer cores saturate. These non-linearities interact with the series capacitor to produce a low-frequency resonant condition, often in response to large inrush currents following breaker operations. Self-excitation of induction motors is a potentially damaging condition that can occur on the same system. The term "self-excitation" refers to sub-harmonic oscillations that may occur in an electric supply circuit that includes series capacitors. The sub-harmonic oscillations result from the interaction between the series capacitors and an induction motor when the motor is in the process of starting. These oscillations are typically characterized by motor starting problems and sustained overcurrent conditions.

When ferroresonance occurs, immediate action must be taken to prevent damage to other equipment. Ferroresonance is a rapidly occurring, high magnitude, and low frequency oscillation capable of reaching power system voltage levels of 100-200% above normal for brief periods. When self-excitation occurs, low-frequency oscillations are produced as the motor starting sequence fails. The motor will search for the proper operating frequency, which will cause large current surges as the shaft acceleration alternates.

Power generation sites (e.g., thermal prime movers, induction generators, wind turbines, etc.) are often located very far from load centers. To enable the transmission of power over long distances, the use of series capacitors is often employed to raise the power limits of the resulting long transmission lines. The series capacitors can cause series-resonant oscillations, which have been known to cause damage to generator shafts. Damage could also be inflicted on wind turbine power transmission and control components.

The series-resonant oscillations occur at a sub-harmonic of the supply frequency (typically 60 Hz in North America). This effect has become known as subsynchronous resonance (SSR). The most famous incident involving SSR occurred in 1970 and again in 1971 at the Mohave Generating Station in southern Nevada, USA. A generator experienced a gradually growing vibration that eventually led to a fracture of the shaft section between the generator and the rotating exciter. Investigations determined that an electrical resonance at 30.5 Hz produced torque at 29.5 Hz (the 60 Hz compliment frequency), which was near coincident with the frequency of the second torsional vibration-mode of the turbine-generator at 30.1 Hz. This interaction between the series capacitors and the torsional system is an example of subsynchronous resonance.

Wind turbines and wind farms are becoming increasingly popular and are being installed in greater numbers around the world. The best locations for wind farms are often located far from load centers. In addition, multiple wind farms may need to be connected to an existing electrical grid that may also connect to thermal generation stations (e.g., gas or steam turbines driving one or more generators).

BRIEF SUMMARY OF THE INVENTION

According to one aspect of the present invention, a system is provided for compensating a power transmission line having one or more non-conventional power generating sources connected to the power transmission line. At least one series compensation circuit is connected to a portion the power transmission line, and at least one damping circuit is connected in parallel with the series compensation circuit. The damping circuit reduces subsynchronous series resonance caused by the series compensation circuit on the power transmission line, and the series compensation circuit compensates the power transmission line.

BRIEF DESCRIPTION OF THE DRAWINGS

FIG. 6 is a simplified schematic diagram of the compensation circuit according to one aspect of the present invention;

FIG. 7 is a simplified schematic diagram of the compensation circuit according to one aspect of the present invention.

DETAILED DESCRIPTION OF THE INVENTION

The modem utility grid is evolving into a network that includes disparate generation sources located far from load centers. Multiple wind farms, solar power generating stations, and other non-conventional power sources are being connected to the existing power transmission lines. Different suppliers manufacture wind turbines and each supplier can manufacture their wind turbines with different operating characteristics. Solar power suffers the same problem. This wide variability in operating characteristics makes it difficult to connect these non-conventional power-generating sources to the existing transmission lines.

Figure 1:
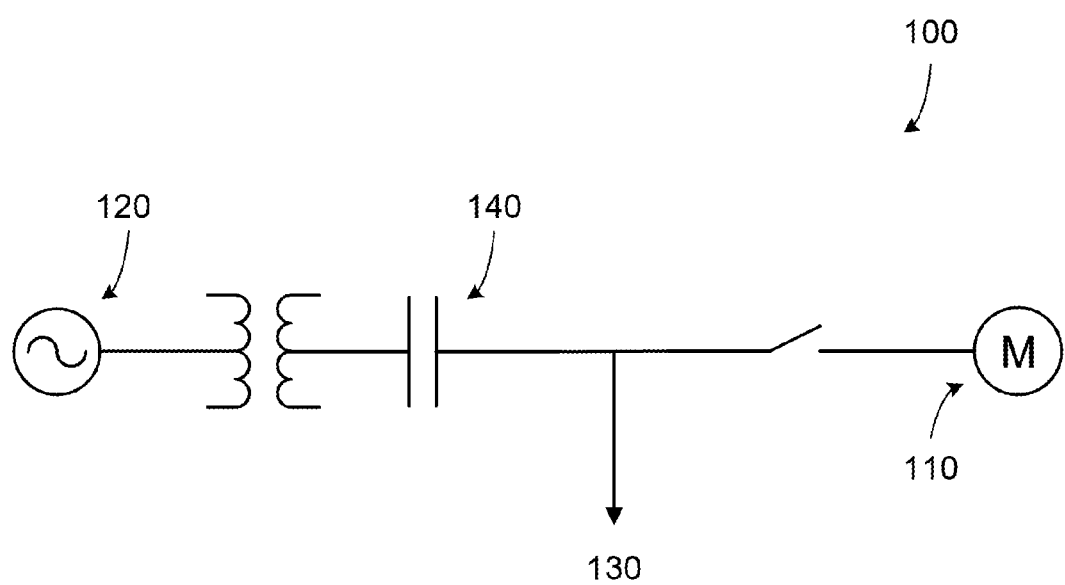
FIG. 1 illustrates a conventional voltage flicker problem in an electrical distribution system.
Figure 2:
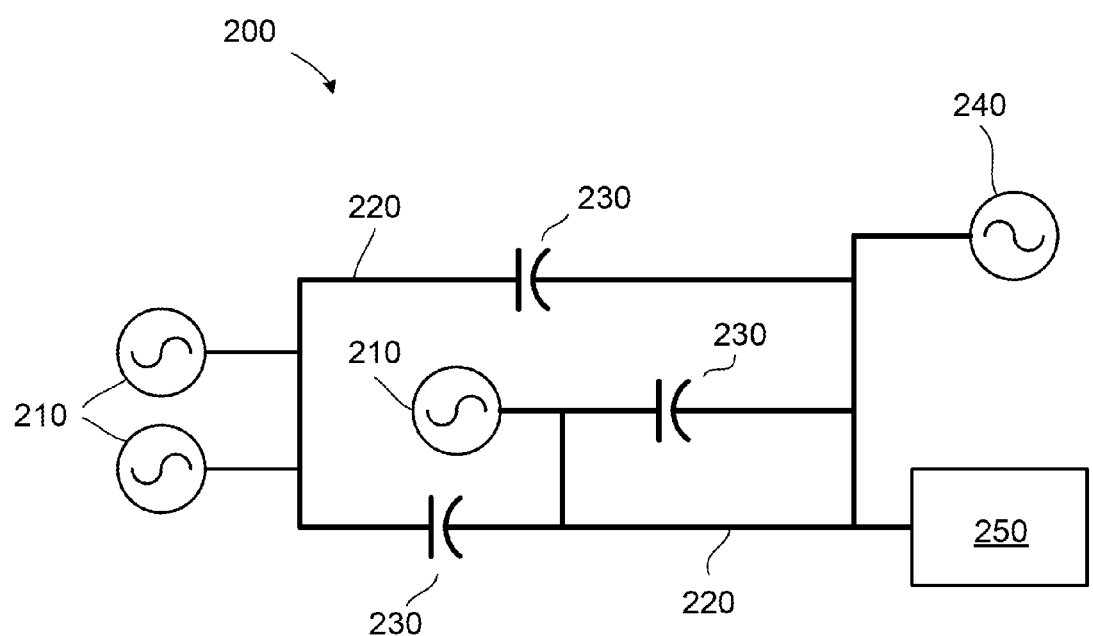
FIG. 2 is a simplified schematic illustration of one known power grid.

FIG. 2 illustrates a simplified example of one typical utility grid 200. One or more non-conventional generating sources 210 can be connected to various parts of the grid. The non-conventional generating sources 210 can comprise various types of prime movers (e.g., wind turbines, wind farms, solar generating stations, etc.), and may be characterized by non-conventional electrical interfaces to the grid.

The non-conventional electrical interfaces may include induction generators or power electronic systems that can interact adversely with lightly damped series resonances in the transmission grid. The non-conventional generating sources 210 can comprise individual sources (e.g., a single wind turbine) or a group of sources (e.g., a wind farm comprising many turbines). Individual wind turbines may have power ratings of about 1.5 to about 3.0 MW or more, and wind farms may have a collective power rating of about 100 to about 500 MW or more. These ranges are for illustrative purposes only and may extend above or below the ranges given.

The grid 200 may also include one or more conventional generating sources 240 and one or more loads 250. Conventional generating sources typically comprise synchronous machines and may have power ratings of about 100 MW to 1300 MW or more per machine. An example of a conventional generating source is a gas or steam powered turbine that drives an electrical generator.

The series capacitors 230 are required in long transmission lines 220 to compensate for the inherent inductive reactance. The disadvantage to series compensation is that it creates lightly damped series resonances having frequency below the synchronous frequency (i.e., subsynchronous). The non-conventional generators 210 can interact with the lightly damped series resonances in the transmission lines 220 in a number of ways, which can cause damage to the generators 210.

The simplest form of non-conventional generation is a wind turbine using a simple induction generator. Radial transmission of large amounts of induction-generated electrical power through series-compensated lines is new to modern power systems because of the rise of wind power. With this new power source comes potential problems, among these problems is a specific subsynchronous phenomenon known as induction generator effect (IGE). The root cause of this effect is that induction machines appear as a negative resistance to electrical oscillations having frequency less than that induced by the rotor speed. When a series capacitor is added to the network, then the resulting subsynchronous series resonance with the inherent inductance of the network will be destabilized by the induction-generator negative resistance effect and can lead to an electrical instability.

Other types of non-conventional generation rely extensively on power electronics to convert power from the prime mover to the electrical characteristic needed by the grid. Power electronics inherently require several complex control algorithms operating at high speed to perform their function. Due to the high-speed nature of the algorithms, there will be substantial interaction with the subsychronous series resonance of the transmission grid that is created by series compensation. These control algorithms are designed based upon a simplified assumption of grid characteristics. It is impractical to design such algorithms to accommodate any arbitrary grid characteristic. Further, the details of these algorithms that govern the interaction phenomena vary with manufacturer and are typically considered highly proprietary.

A transmission line owner/operator may expend a large amount of labor and expense to individually tailor their transmission line to each disparate power source. Alternatively, the developers of each non-conventional power generating station must work in great detail with the vendor(s) of their generating equipment and with the vendor(s) of other non-conventional generating-station developers to coordinate their operating characteristics to accommodate the transmission grid. Such coordination is not only extremely onerous and expensive to achieve, but is prohibited by existing regulations governing competitive generation markets.

An aspect of the present invention provides a transmission-compensation system that can couple multiple disparate generation sources to a common electrical grid, without the requirement for extensive coordination between generating stations, or requiring expensive and difficult efforts by the transmission system operator. Further aspects of the system of the present invention provide for damping subsynchronous series resonance at the series capacitor location.

Figure 3:
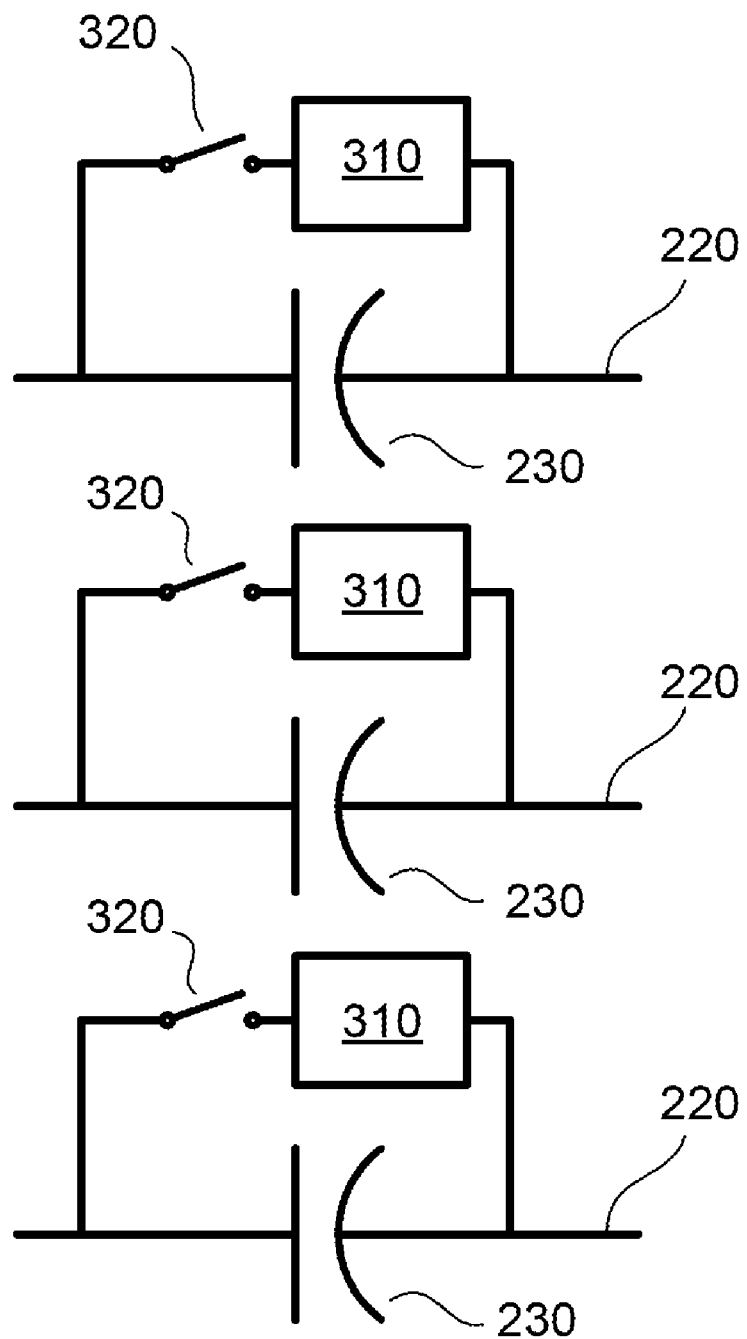
FIG. 3 is a simplified schematic diagram of the compensation circuit according to one aspect of the present invention.

FIG. 3 illustrates an improved series compensation circuit according to one aspect of the present invention. The transmission line 220 is series compensated by series capacitor 230. However, a damping circuit 310 is placed in parallel with capacitor 230. The damping circuit can be broadly tuned to decrease or eliminate subsynchronous resonance caused by capacitor 230. In addition, a switch 320 may also be placed in series with damping circuit 310. The switch 320 can isolate the damping circuit in case of failure or for system maintenance. It is to be understood that a switch 320 could be placed on both sides of damping circuit 310 if desired. FIG. 6 illustrates a transmission line 220 having three phases where the damping circuit 310 is connected to only one phase of transmission line 220. FIG. 7 illustrates a transmission line 220 having three phases where the damping circuit 310 is connected to only two phases of transmission line 220.

Figure 4:
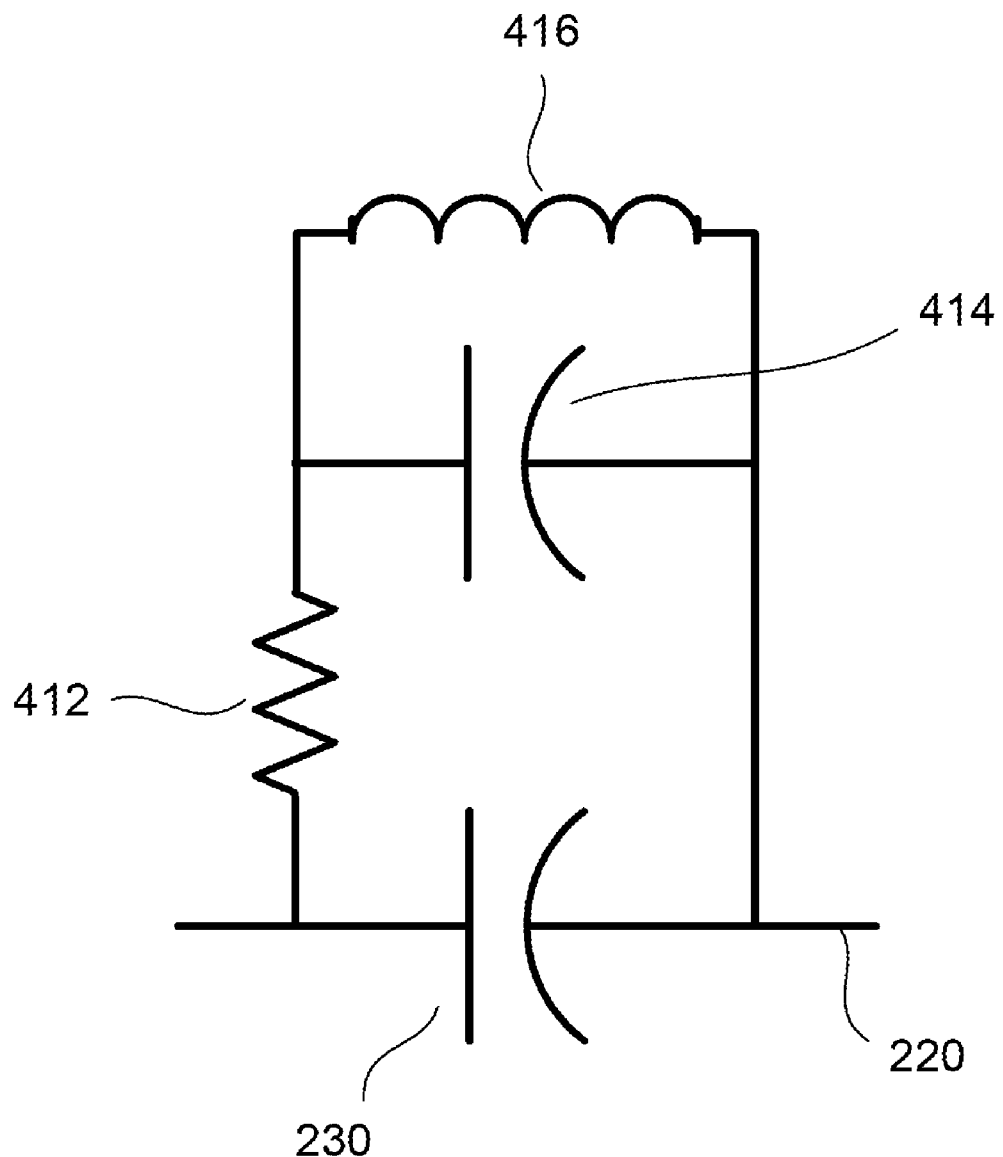
FIG. 4 is a simplified schematic diagram of the damping circuit according to one aspect of the present invention.

FIG. 4 illustrates a schematic circuit diagram of one embodiment of damping circuit 310, according to aspects of the present invention. The damping circuit is comprised of resistor 412, capacitor 414 and inductor 416. The damping circuit can be placed in parallel with the series compensation capacitor 230 or transmission line 220. Switch 320 is optional and not shown in this embodiment.

The resistor 412 damps the subsychnronous series resonance caused by capacitor 230. A capacitor 414 and inductor 416 are connected in parallel, and in series with resistor 412. The capacitor 414 and inductor 416 block current in resistor 412 at the synchronous frequency and reduce losses, which would have been attributed to resistor 412. The passive components of the damping circuit are tuned for a broadband response, to compensate for all types of non-conventional power generating sources 210, which may be connected to transmission line 220.

Figure 5:
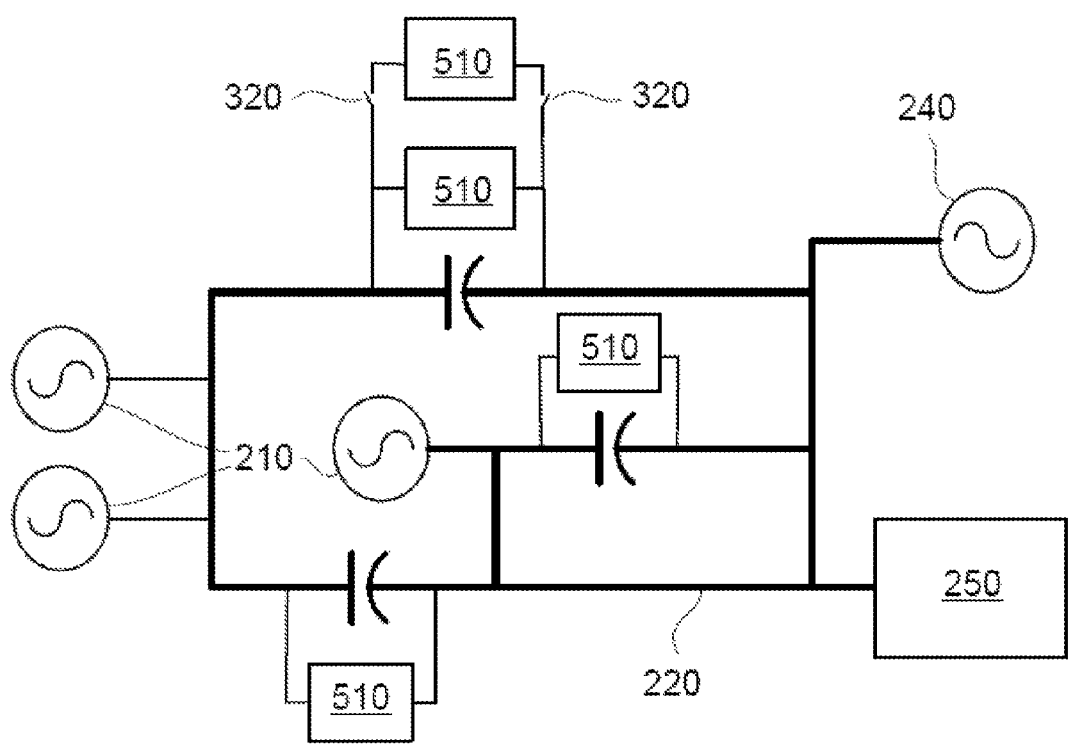
FIG. 5 is a simplified schematic diagram a power grip incorporating the compensation and damping circuit according to one aspect of the present invention.

FIG. 5 illustrates a simplified schematic of a utility grid incorporating aspects of the present invention. The damping circuit 510 is shown connected in parallel to the series capacitors 230. The damping circuit 510 may be a single or multiple (e.g., 2 or 3) phase version of damping circuit 310. Switches 320 (not shown in FIG. 5) may also be included in damping circuit 510. The damping circuit 510 protects the non-conventional power generating sources 210 from damage due to subsynchronous resonance.

Many transmission lines are configured as 3-phase lines, and the damping circuit of the present invention could be placed on one, two or all three phases. The passive components of the damping circuit could also be configured in a variety of ways. In the figures a resistor is shown connected in series to a capacitor and inductor connected in parallel. However, the resistor 412 could be replaced by a resistor connected in series with an inductor, a resistor connected in series with an inductor and capacitor, a resistor connected in parallel with a series connected inductor and capacitor, and other suitable configurations. The damping circuit could also be configured as a parallel connected resistor, inductor and capacitor.

The switch 320 could also be configured to switch to a backup damping circuit if the primary damping circuit 310 fails. In this embodiment, two or more damping circuits could be connected in parallel, but isolated via one or more switches. If a primary damping circuit failed, a local or remote control signal could be activated to operate one or more switches to disconnect the failed primary damping circuit, and switch in a secondary or backup damping circuit. The control of the switches could also be performed locally as well.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for compensating a power transmission line, comprising:
   one or more non-conventional power generating sources, said one or more non-conventional power generating sources connected to said power transmission line;
   at least one series compensation circuit connected to at least a portion of said power transmission line;
   at least one damping circuit connected in parallel with said at least one series compensation circuit, the at least one damping circuit comprising at least one resistor connected in series with a parallel connected capacitor and inductor, the at least one damping circuit tuned to decrease subsynchronous resonance, the at least one resistor tuned to damp subsynchronous resonance, and the capacitor and inductor are tuned to block current in the at least one resistor at a synchronous frequency;
   wherein, said at least one damping circuit is tuned for a broadband response to subsynchronous series resonance and reduces subsynchronous series resonance caused by said at least one series compensation circuit on said power transmission line, and wherein said at least one series compensation circuit compensates said power transmission line.

2. The system of claim 1, further comprising:
   at least one conventional power generating source connected to said power transmission line.

3. The system of claim 2, wherein said at least one conventional power generating source is of the synchronous machine type.

4. The system of claim 1, wherein said one or more non-conventional power generating sources are selected from one or more of the group comprising:
   a wind turbine, a wind farm, a solar power generating station.

5. The system of claim 1, wherein said at least one compensation circuit comprises at least one series capacitor.

6. The system of claim 1, further comprising:
   at least one switch, said at least one switch connected between said at least one series compensation circuit and said at least one damping circuit;
   wherein, operation of said at least one switch connects or isolates one of said at least one damping circuit to or from said at least one series compensation circuit.

7. The system of claim 6, further comprising:
   two or more damping circuits connected in parallel with said at least one compensation circuit;
   means for electrically isolating said two or more damping circuits from each other, and for selectively connecting one of said damping circuits to said at least one compensation circuit.

8. The system of claim 7, wherein one of said damping circuits is a primary damping circuit and another of said damping circuits is a backup damping circuit, the primary damping circuit and the backup damping circuit configured to be used in a complimentary manner so that when the primary damping circuit is connected the backup damping circuit is disconnected and when the backup damping circuit is connected the primary damping circuit is disconnected.

9. The system of claim 1, said power transmission line comprising one or more phases, said at least one compensation circuit connected to each of said one or more phases, wherein, said at least one damping circuit is connected to only one phase of said power transmission line.

10. The system of claim 1, said power transmission line comprising one or more phases, said at least one compensation circuit connected to each of said one or more phases, wherein, said at least one damping circuit is connected to two phases of said power transmission line.

11. The system of claim 1, said power transmission line comprising one or more phases, said at least one compensation circuit connected to each of said one or more phases, wherein, said at least one damping circuit is connected to three phases of said power transmission line.

12. A system for compensating a power transmission line, comprising:
   one or more non-conventional power generating sources, said one or more non-conventional power generating sources connected to said power transmission line;
   at least one series compensation circuit connected to at least a portion of said power transmission line;
   at least one damping circuit connected in parallel with said at least one series compensation circuit, the at least one damping circuit comprising at least one resistor connected in series with a parallel connected capacitor and inductor, the at least one damping circuit tuned to decrease subsynchronous resonance, the at least one resistor tuned to damp subsynchronous resonance, and the capacitor and inductor are tuned to block current in the at least one resistor at a synchronous frequency;
   at least one switch, said at least one switch connected between said at least one series compensation circuit and said at least one damping circuit, operation of said at least one switch can connect or isolate said at least one damping circuit from said at least one series compensation circuit; and
   wherein, said at least one damping circuit is tuned for a broadband response to subsynchronous series resonance and reduces subsynchronous series resonance caused by said at least one series compensation circuit on said power transmission line, and wherein said at least one series compensation circuit compensates said power transmission line.

13. The system of claim 12, further comprising:
   at least one conventional power generating source connected to said power transmission line; and
   wherein said at least one conventional power generating source is of the synchronous machine type.

14. The system of claim 12, wherein said one or more non-conventional power generating sources are selected from one or more of the group comprising:

a wind turbine, a wind farm, a solar power generating station.

15. The system of claim 12, wherein said at least one compensation circuit comprises at least one series capacitor.

16. The system of claim 12, further comprising:
two or more damping circuits connected in parallel with said at least one compensation circuit;
means for electrically isolating said two or more damping circuits from each other, and for selectively connecting only one of said damping circuits to said at least one compensation circuit.

17. The system of claim 16, wherein one of said damping circuits is a primary damping circuit and another of said damping circuits is a backup damping circuit.

18. The system of claim 12, said power transmission line comprising one or more phases, said at least one compensation circuit connected to each of said one or more phases, wherein, said at least one damping circuit is connected to only one phase of said power transmission line.

19. The system of claim 12, said power transmission line comprising one or more phases, said at least one compensation circuit connected to each of said one or more phases, wherein, said at least one damping circuit is connected to two phases of said power transmission line.

20. The system of claim 12, said power transmission line comprising one or more phases, said at least one compensation circuit connected to each of said one or more phases, wherein, said at least one damping circuit is connected to three phases of said power transmission line.

* * * * *